(12) United States Patent
Mani

(10) Patent No.: US 9,912,985 B2
(45) Date of Patent: Mar. 6, 2018

(54) CONTENT DISTRIBUTION

(71) Applicant: INTEL CORPORATION, Santa Clara, CA (US)

(72) Inventor: Jothikumar Mani, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/499,029

(22) Filed: Sep. 26, 2014

(65) Prior Publication Data

US 2016/0094872 A1    Mar. 31, 2016

(51) Int. Cl.
| | |
|---|---|
| H04N 7/16 | (2011.01) |
| H04N 21/4363 | (2011.01) |
| H04N 21/236 | (2011.01) |
| H04N 21/41 | (2011.01) |
| H04N 21/436 | (2011.01) |
| H04N 21/438 | (2011.01) |
| H04N 21/61 | (2011.01) |
| H04N 21/6405 | (2011.01) |
| H04N 21/643 | (2011.01) |

(52) U.S. Cl.
CPC . *H04N 21/43637* (2013.01); *H04N 21/23605* (2013.01); *H04N 21/4126* (2013.01); *H04N 21/4381* (2013.01); *H04N 21/43615* (2013.01); *H04N 21/6131* (2013.01); *H04N 21/6181* (2013.01); *H04N 21/6405* (2013.01); *H04N 21/64322* (2013.01)

(58) Field of Classification Search
None
See application file for complete search history.

(56) References Cited

U.S. PATENT DOCUMENTS

| | | | |
|---|---|---|---|
| 7,500,261 B1 | 3/2009 | Myers | |
| 2002/0019984 A1* | 2/2002 | Rakib | G08B 13/19656 725/111 |
| 2004/0181800 A1 | 9/2004 | Rakib et al. | |
| 2005/0240972 A1* | 10/2005 | Zhang | H04W 8/18 725/81 |
| 2008/0025306 A1 | 1/2008 | Kamura | |
| 2008/0120667 A1* | 5/2008 | Zaltsman | H04L 12/2856 725/110 |
| 2008/0175325 A1* | 7/2008 | Hannuksela | H04N 21/222 375/240.26 |
| 2008/0244637 A1* | 10/2008 | Candelore | H04N 7/163 725/28 |

(Continued)

FOREIGN PATENT DOCUMENTS

WO    WO2008027331 A2    3/2008

OTHER PUBLICATIONS

International Search Report and Written Opinion for International Application No. PCT/US2015/046821 dated Oct. 28, 2015; 9 pages.

(Continued)

*Primary Examiner* — Fernando Alcon
(74) *Attorney, Agent, or Firm* — Schwabe, Williamson & Wyatt, P.C.

(57) ABSTRACT

Embodiments relate to content distribution from a settop box in which audio/visual data is distributed to one or more than one user equipment by an eNB by emulating at least one of the LTE M2 and M3 interfaces.

20 Claims, 11 Drawing Sheets

(56) References Cited

U.S. PATENT DOCUMENTS

| | | | |
|---|---|---|---|
| 2010/0100898 A1* | 4/2010 | Pfleging | H04N 7/17318 |
| | | | 725/28 |
| 2010/0238924 A1 | 9/2010 | Liu | |
| 2011/0026522 A1* | 2/2011 | Hsu | H04N 21/234381 |
| | | | 370/390 |
| 2011/0044225 A1* | 2/2011 | Rinne | H04W 72/005 |
| | | | 370/312 |
| 2011/0154421 A1* | 6/2011 | Chun | H04N 21/2385 |
| | | | 725/109 |
| 2013/0111520 A1* | 5/2013 | Lo | H04L 67/306 |
| | | | 725/35 |
| 2013/0142053 A1 | 6/2013 | Amerga et al. | |
| 2013/0182631 A1* | 7/2013 | Jamadagni | H04B 7/15592 |
| | | | 370/312 |
| 2013/0215817 A1* | 8/2013 | Lu | H04L 12/1868 |
| | | | 370/312 |
| 2013/0286927 A1* | 10/2013 | Jiao | H04W 76/002 |
| | | | 370/312 |
| 2014/0348055 A1* | 11/2014 | Hoymann | H04B 7/15557 |
| | | | 370/315 |

OTHER PUBLICATIONS

Notice of Preliminary Rejection dated Sep. 26, 2017 from Korean Patent Application No. 2017-7005161, 9 pages.

\* cited by examiner

1000

CONTENT DISTRIBUTION

TECHNICAL FIELD

Embodiments relate to distributing content and, more particularly, to distributing content wirelessly.

BACKGROUND

Satellite and cable TV service providers allow customers to watch television or listen to the radio in any room having a TV or radio and an associated set-top box. However, to watch TV in different rooms of a house, the house owner must, firstly, subscribe to multi-room service offered by a TV service provider and, secondly, have supporting hardware, in the form of a TV and set-top box, for receiving and displaying cable or satellite TV in each room, which might be prohibitively expensive.

The demand for mobile content and the convergence of mobile communications and TV media is anticipated as leading to a dramatic increase multimedia consumption, which, in turn, introduces technical challenges associated with network capacity and signalling, as well as associated with delivering that content. The 3GPP Releases 10, 11 and 12 prescribe requirements for evolved Multimedia Broadcast Multicast Services (eMBMS) to support LTE multi-party content distribution. Content providers can distribute, for example, TV content within a defined area using LTE infrastructure. However, this requires the service or content providers to make their content available via LTE infrastructure.

BRIEF DESCRIPTION OF THE DRAWINGS

Embodiments described herein are illustrated, without limitation, by way of example, in the accompanying drawings.

DESCRIPTION OF EMBODIMENTS

Figure 1:
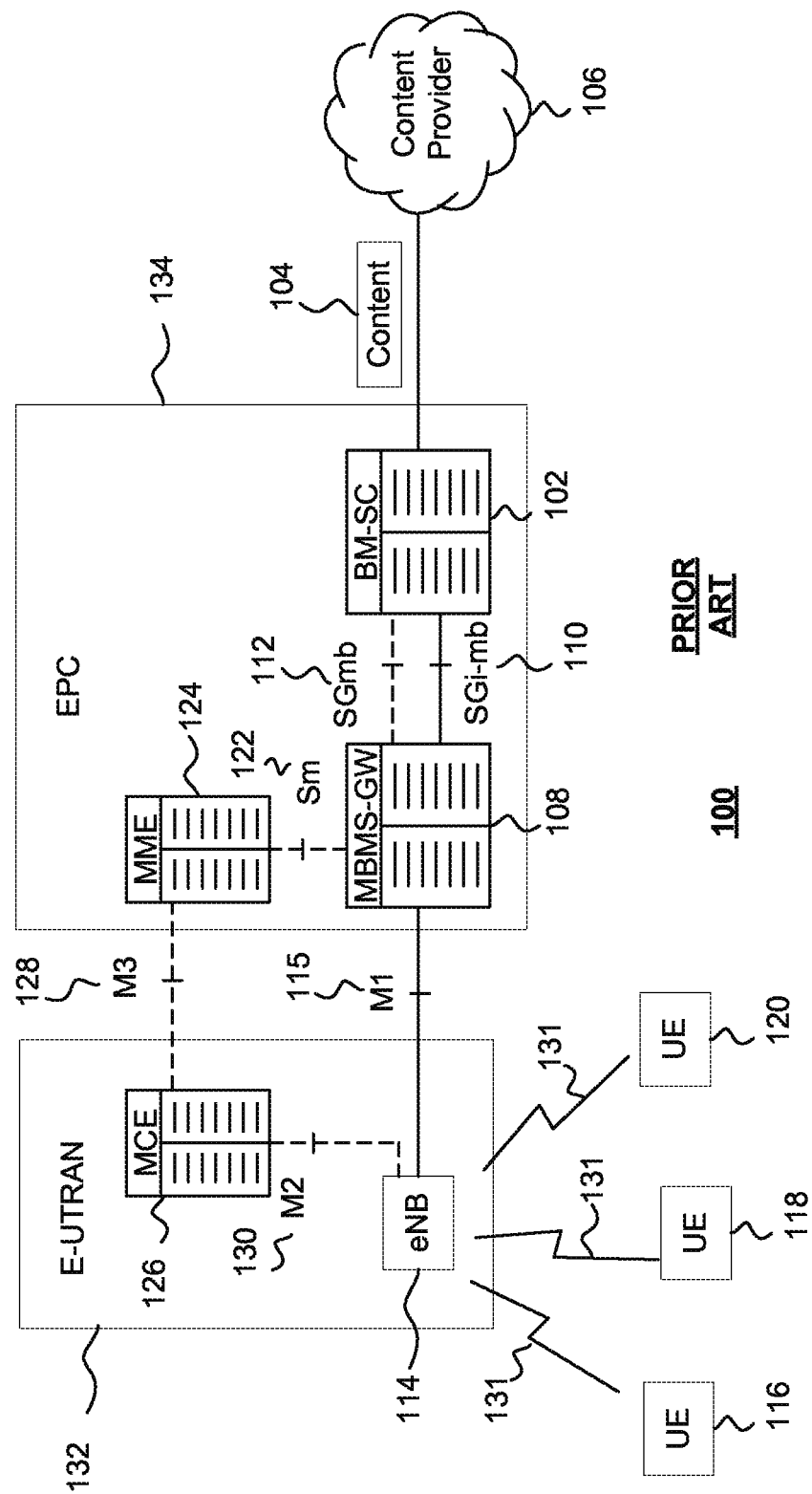
FIG. 1 shows a known LTE content distribution network.

FIG. 1 shows a multimedia broadcast/multicast service (MBMS) architecture 100 for delivering content over a Long Term Evolution-Advanced (LTE-A) infrastructure using Multimedia Broadcast/Multicast Services (MBMS) or evolved Multimedia Broadcast/Multicast Services (eMBMS).

It can be appreciated that a broadcast/multicast service center (BM-SC) 102 receives and forwards content 104 distributed by a content provider 106.

The BM-SC 102 forwards the content to a multimedia broadcast/multicast service gateway (MBMS-GW) 108 via a respective SGi-mb interface 110 together with corresponding signalling over a SGmb signalling interface 112. The content 104 is carried across the SGi-mb interface 110 using IP multicast. The BM-SC 102 signals the beginning of a MBMS session associated with the content 104 via suitable signaling across the SGmb interface 112, including providing a message (not shown) containing an indication of resources required to deliver the content 104. It will be appreciated that starting and terminating an MBMS session for multicasting IP pacets is disclosed in 3GPP Technical Standard 36.442, v12.0.0.

The MBMS-GW 108 is configured to distribute the content 104 to one or more than one eNB 114 for forwarding that content 104 to one or more than one user equipment, such as, for example, one or more of the three user equipments 116, 118 and 120 illustrated. The content 104 is forwarded to the one or more eNB 114 via one or more than one respective M1 interface 115.

The above message (not shown) is propagated throughout the network, across an Sm interface 122 to a Mobile Management Entity (MME) 124 that, in turn, communicates with a multicell/multicast coordination entity (MCE) 126 via an M3 signalling interface 128. The MCE 126 provides signalling to the one or more eNB 114 for synchronising distribution of the content 104 over a geographical area, which is known as a Multicast-Broadcast Single-Frequency Network (MBSFN) area, via one or more than one M2 interface 130. The M2 interface indicates which modulation scheme, coding rate and subframe allocation should be used by the one or more than one eNB 114 in transmitting the content over the air interface 131.

The eNB 114 and the MCE 126 form part of an Evolved UMTS Terrestrial Radio Access Network (E-UTRAN) 132 and the BM-SC 102, MBMS-GW 108 and MME 124 form part of an Evolved Packet Core (EPC) 134.

Operationally, the one or more user equipments intending to receive the content power-up and reads a System Information Block (SIB) to obtain information for cell access, SIB scheduling and radio resource configuration. A user equipment 116 to 120 then reads a System Information Block 13 to access information to allow that user equipment to receive broadcast services. SIB 13 comprises data indicating the MBSFN area to which the one or more eNB 114 belongs as well as the subframes that bear the multicast control channel together with a respective modulation scheme and coding rate used.

The multicast control channel bears a Radio Resource Control (RRC) signalling message, that is, MBSFN Area Configuration message containing data identifying the physical multicast control channels (PMCH), which lists multicast traffic channels together with respective subframes, the modulation scheme and coding rate and associated scheduling data in the form of an MCH scheduling period. The user equipment 116 to 120 determines from the PMCH how the subframes are shared over various multicast traffic channels via MCH scheduling information which, in turn, allows a user equipment to receive each instance of the MTCH.

It can be appreciated that the above architecture is complex and receiving content 104 requires the content provider 106 to make the content available for MBMS distribution, which is not always the case regarding satellite and cable TV, which are distributed other than via an LTE eMBMS architecture. Therefore, a user subscribing to a satellite or cable TV service is only able to receive that service in the conventional manner and cannot readily extend the distribution of that content to other devices or rooms of their house.

Figure 2:
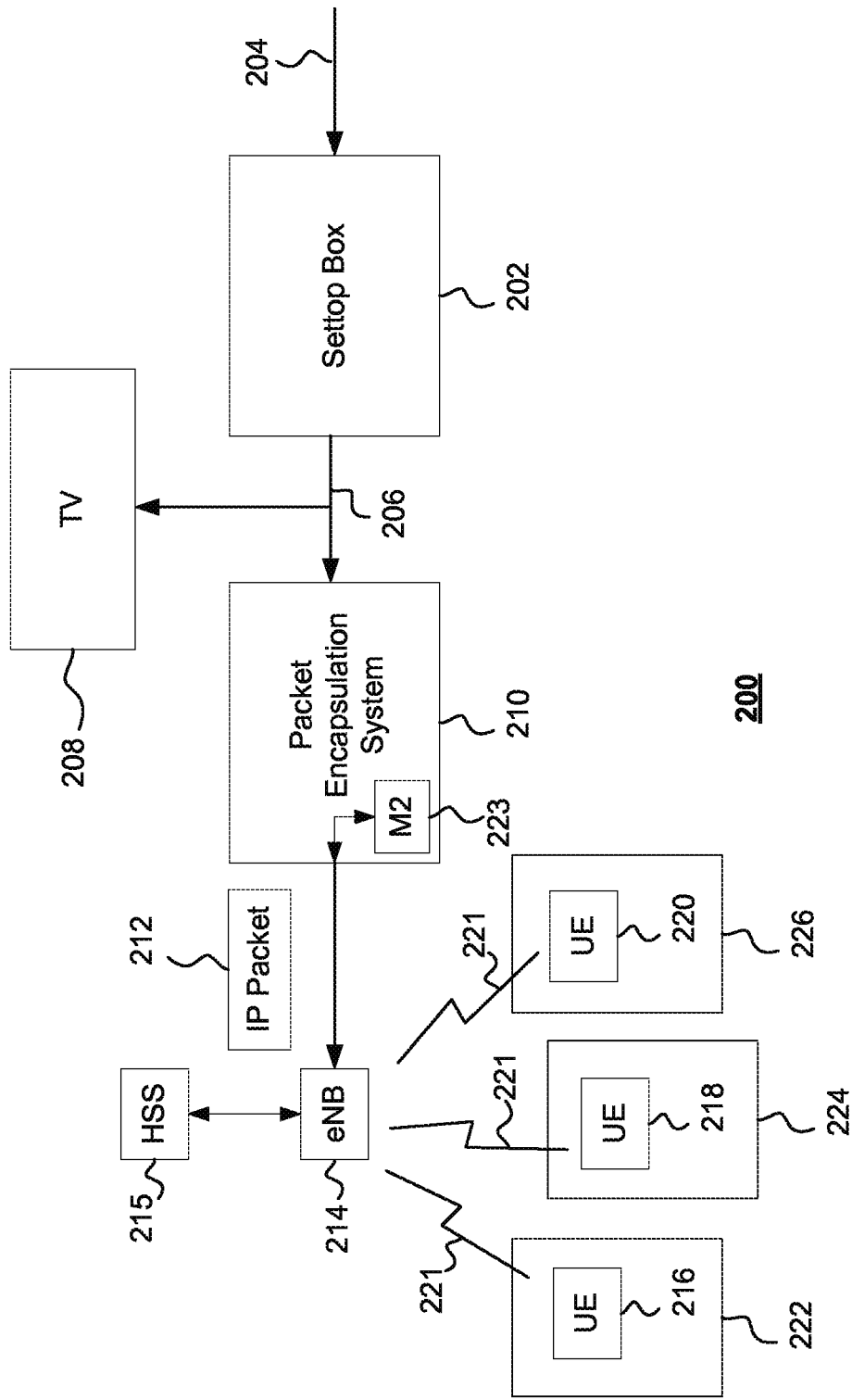
FIG. 2 depicts a first embodiment of a content distribution system.

FIG. 2 illustrates an architecture 200 for distributing received satellite or cable TV content to one or more than one LTE user equipment. The architecture 200 comprises a settop box 202. The settop box can be, for example, a cable TV settop box, a satellite TV settop box or other settop box for receiving a content bearing signal. The content bearing signal 204 can comprise digitally formatted or digitally encoded data such as a DVB-S2 or DVB-C2 compliant signal carrying audio/visual data. The content bearing signal 204 is processed by the settop box 202 and a video signal 206 is output for subsequent display on a TV 208.

The video signal has a respective format. Therefore, the video signal can be at least one of an HDMI video signal, an S-video signal or some other format video signal such as, for example, a digital video signal like an MPEG-4 signal.

The video signal 206 is also forwarded to a Packet Encapsulation System (PES) 210. The PES 210 is arranged to process the video signal to encapsulate it within respective IP packets 212. The IP packets 212 are forwarded to an eNB 214 as IP multicast packets.

The eNB 214 is configured for eMBMS content delivery to one or more than one user equipment 216 to 220 over an air interface 221. The one or more than one user equipment 216 to 220 are LTE devices that can receive eMBMS, that is, they are compliant with the LTE-A standards such as, for example, LTE-A release 9 onwards and, for example, 3GPP TS 22.146 version 11 and the References identified therein. In the embodiment illustrated, three such user equipments 216 to 220 are shown. The content delivered to the one or more than one user equipment 216 to 220 is the video signal 206 output by the settop box 202 and forwarded in an IP stream having respective the IP packets 212.

Preferably, and optionally, before the one or more than one user equipment 216 to 220 can receive the content, those user equipment should be granted access to the network. Access control is performed via a Home Subscriber Server (HSS) 215. The HSS 215 maintains identification data associated with the one or more than one user equipment 216 to 220 such as, for example, an International Mobile Subscriber Identity. The HSS can also maintain further respective security information associated with the one or more than one user equipment 216 to 220 such as, for example, associated security vectors. User equipment authentication and access is performed in the usual manner by the HSS 215.

The one or more than one user equipment 216 to 220 identifies the data for receiving the content from SIB 2 and SIB 13 as indicated above and renders the content using a respective output application running on the one or more than one user equipment together with an output medium such as at least one of a display and speaker.

A first embodiment can be realised in which the eNB 214 is configured merely to broadcast the content received in the IP packets to the one or more than one user equipment 216 to 220. The first embodiment has the feature that uplink communication such as a user equipment attaching and receiving an attach response, via the M3 interface described above, is not needed.

An M2 emulator 223 is provided to establish the MBMS session and M2 set-up in accordance with 3GPP Technical Standard 36.443 v12.0.0. The M2 emulator 223 emulates sending an MBMS Service Counting Request message, defined in TS 36.4434, v12.0.0, section 9.1.24, to the eNB 214. The message contains data, in the TMGI field, representing one or more than one channel offered from the set-top box 202, which, ultimately, is used by the one or more than one user equipment, or, more particularly, the application executing on the one or more than one user equipment 216 to 220, to select a channel, mapped to an MBMS Session, to be received by the one or more than one user equipment 216 to 220.

It can be appreciated that the one or more than one user equipment 216 to 220 are illustrated as being located within respective rooms 222 to 226 and the content, in the form of a eMBMS multicast, is distributed by the air interface 221.

The above architecture distributes the content output by the settop box 202 to one or more than one user equipment 216 to 220, firstly, without the need for a settop box being in every room, secondly, without a TV being needed is every room and, thirdly, without a subscription or other fee having to be paid for multi-room content distribution.

Figure 3:
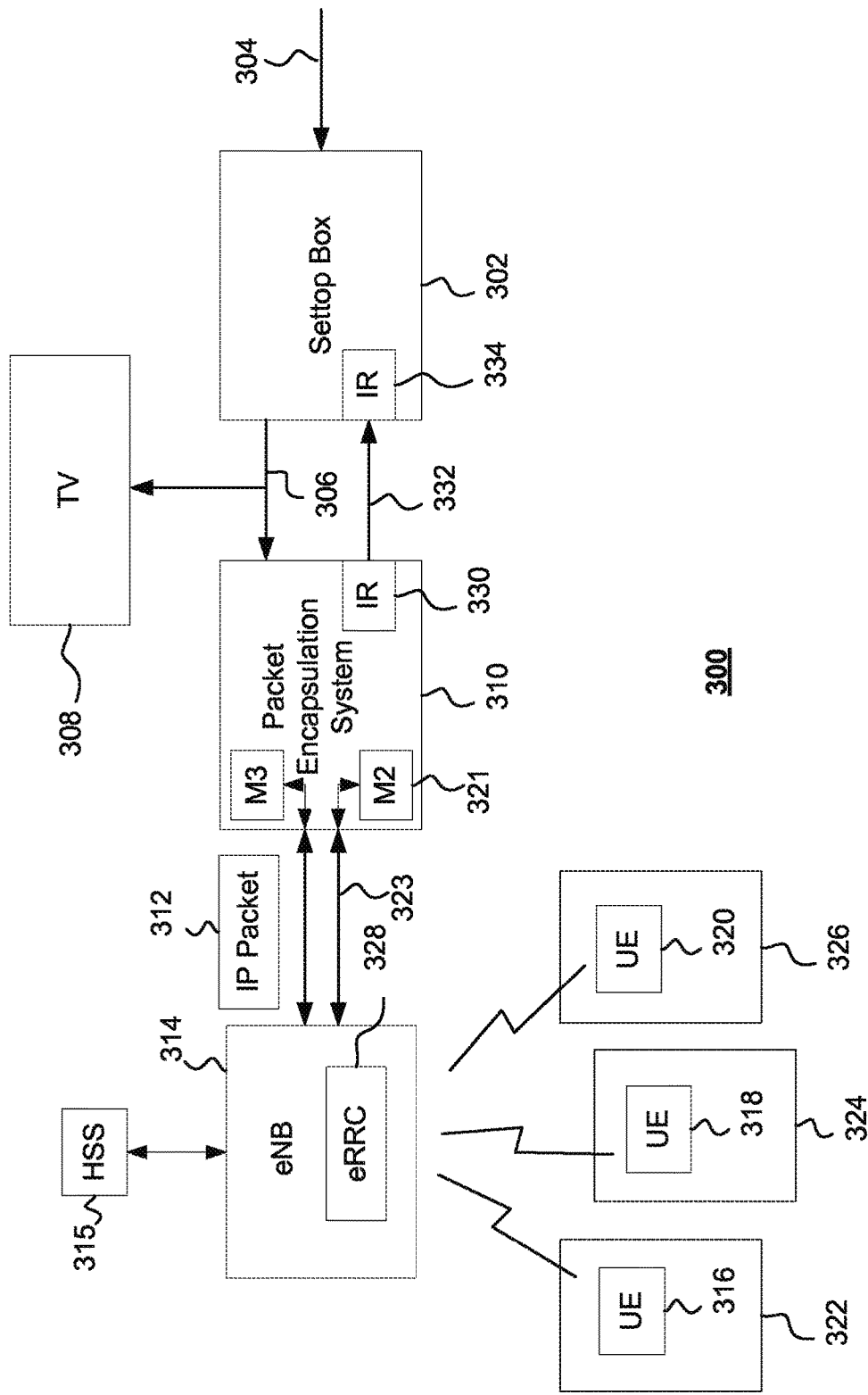
FIG. 3 illustrates a second embodiment of a content distribution system.

Referring to FIG. 3, there is shown an architecture 300 for distributing received satellite or cable TV content to one or more than one LTE user equipment. The one or more than one user equipment 316 to 320 are LTE devices that can receive eMBMS, that is, they are compliant with the LTE-A standards such as, for example, 3GPP TS 22.146 version 11 and the References identified therein, as well as the MBMS Counting Procedure defined in 3GPP TS 36.331, v.12.2.0, and TS 36.443, v12.0.0. The architecture 300 comprises a settop box 302. The settop box 302 can be, for example, a cable TV settop box, a satellite TV settop box or other settop box for receiving a content bearing signal. The settop box 302 is arranged to receive a content bearing signal 304. The content bearing signal 304 can comprise digitally formatted or digitally encoded data such as a DVB-S2 or DVB-C2 compliant signal carrying audio/visual data. The content bearing signal 304 is processed by the settop box 302 and a video signal 306 is output for subsequent display on a TV 308. It will be appreciated that the content bearing signals 204 and 304 are embodiments of a TV content bearing signal. It will also be appreciated that video signals 206 and 306 are embodiments of TV content signals.

The video signal has a respective format. Therefore, the video signal can be at least one of an HDMI video signal, an S-video signal or some other format video signal.

The video signal 306 is also forwarded to a Packet Encapsulation System (PES) 310. The PES 310 is arranged to process the video signal to encapsulate it within respective IP packets 312. The IP packets are forwarded to an eNB 314 as IP multicast packets.

Preferably, and optionally, before the one or more than one user equipment 316 to 320 can receive the content, those user equipment should be granted access to the network. Access control is performed via a Home Subscriber Server (HSS) 315. The HSS 315 maintains identification data associated with the one or more than one user equipment 316 to 320 such as, for example, the International Mobile Subscriber Identities. The HSS can also maintain further respective security information associated with the one or more than one user equipment 316 to 320 such as, for example, associated security vectors. User equipment authentication and access is performed in the usual manner by the HSS 315.

The eNB 314 is configured for eMBMS content delivery to one or more than one user equipment. In the embodiment illustrated, three such user equipments 316 to 320 are shown. The content delivered to the one or more than one user equipment 316 to 320 is the video signal 306 output by the settop box and forwarded in an IP stream having respective IP packets 312.

The one or more than one user equipment 316 to 320 identifies the data for receiving the content from SIB 2 and SIB 13 as indicated above and renders the content using a respective output application running on the one or more than one user equipment together with an output medium such as at least one of a display and speaker.

Unlike the first embodiment in which the eNB 214 is configured merely to broadcast the content received in the IP packets to the one or more than one user equipment 316 to 320, the second embodiment has the feature that uplink communication from the one or more than one user equipment 316 to 320 is supported. The uplink communication is arranged to allow a user equipment to output data to the settop box 302. The data can comprise, for example, at least one of content selection such as channel selection, settop box application selection data or other settop box control data.

To support uplink communication, the eNB 314 needs to engage in the LTE attach procedure to receive an attach confirmation or signal associated with the user equipment requesting attachment to the eNB or other network element, such as, for example, attachment to an entity of the Evolved Packet Core (EPC).

The application executed by the one or more user equipment 316 to 322 allows a user to cause the one or more user equipment to output data for controlling the operation of the settop box 302. Embodiments provide for the output data comprising a channel selection so that the user can control the content being, or to be, delivered to the one or more than one user equipment 316 to 320.

Once the LTE attach procedure has been completed, or, more particularly, emulated, as described below, an M2 interface emulator 321, establishes an MBMS session and M2 set-up in accordance with 3GPP Technical Standard 36.443, v12.0.0. The M2 emulator emulates issuing an MBMS Service Counting Request message, which is the message sent by an MCE to request a receiving eNB to report the number of connected mode UEs that are receiving or are interested in receiving one or more than one MBMS services, as per TS 36.443, v12.0.0, section 9.1.24. The MBMS Service Counting Request message contains a TMGI information element, which is defined in section 9.2.3.3 as containing a Service ID.

In turn, an eNB, as part of its normal operating procedure, sends an MBMSCountingRequest message to the one or more than one user equipment. It will be appreciated from, for example, TS 36.331, v12.2.0, section 5.8.4, that the MBMS counting procedure is used to count the number of RRC_CONNECTED mode UEs that are receiving via a Media Resource Broker (MRB), or interested in receiving via an MRB, a specified MBMS service.

The one or more user equipment 316 to 320 will have been preconfigured with the application for rendering content associated with at least one of the content offered by a user's content service provider and the settop box 302 specifically used to access and display content offered by that content service provider. Also, the list of MBMS services available from the eNB to the one or more than one user equipment can be communicated to the one or more than one user equipment using an LTE RRC MBSFNArea-Configuration message, which contains an Information Element (IE) PMCH-InfoList-r9 that, in turn, can contain an indication of channels available from the settop box 302.

For example, embodiments can be realised in which the IE PMCH-InfoList-r9 contains a further IE MBMS-Session-InfoList-r9 that, in turn, contains a parameter "sessionId-r9", which is a string of 1 byte. The values represented by the one byte can be mapped to corresponding channels offered by the settop box 302. For example, a first value can map to the HBO channel. A second value can map to the EPSN channel, a third channel can map to BBC1 and so on. In this manner, each possible session of the MBMS-SessionInfoList-r9 maps to a respective channel, or subset of channels, available via the settop box 302.

It will be appreciate that the one or more than one user equipment 316 to 320 determines an interest in an MBMS service from the above. Therefore, the application, in response to user actuation or control, is arranged to provide to the lower layers a value to be used in constructing an MBMSCountingResponse message, as defined in TS 36.331, v12.2.0, containing a value indicative of the user's desired channel selection in view of the MBMS-SessionInfoList choices mapping to settop box channels. Embodiments are provided in which the MBMSCountingResponse message communicates a user's channel selection in the MBMSCountingResponse field "countingResponseList-r10". The various possible values of the field "countingResponseList-r10" are arranged to map in the PES to IR codes for channel selection as described below.

The eNB 314, in response to receiving the MBMSCountingResponse message, is arranged to construct an MBMS Service Counting Results Report message, as defined in TS 36.443, v12.0.0, sections 9.1.27 and 9.2.3.3, for transmission to the M2 emulator 321. The TMGI information element is arranged to contain the data associated with a selection of one of the number of channels available via the settop box 302. Therefore, embodiments are provided in which the value of the TMGI information element is set to correspond to the value of the "countingResponseList-r10".

One skilled in the art will appreciate that the MBMSCountingResponse cannot be sent directly to the settop box 302. Therefore, the eNB 314 comprises an RRC 328 that outputs the data contained within the MBMSCountingResponse message from the UE over an M2 interface 323, which is received by the M2 emulator 321 of the PES 310, in the TMGI Information Element (IE) of a MBMS Service Counting Result Report message. Therefore, the TMGI contains data representing a user's channel selection.

The PES 310 contains data representing a mapping between the channels accessible via the settop box 302 and associated IR codes for accessing those channels. Having established the appropriate IR code corresponding to the data contained in TMGI IE of the MBMS Service Counting Results Report message, an IR emitter 330 is arranged to output the corresponding IR code in the form of an IR signal 332. The IR signal 332 is received by an IR receiver 334 of the settop box 302 and used to control the settop box 302 in the conventional manner. In the present example, the settop box 302 will output a video signal 306 containing content corresponding to the channel selected by the user of the one or more user equipment 316 to 320, which, in turn, results in that content being distributed, that is, broadcast or multicast, to the MBSFN area associated with the eNB 314 serving the one or more than one user equipment 316 to 320.

It can be appreciated that the one or more than one user equipment 316 to 320 are illustrated as being located within respective rooms 322 to 326.

The above architecture distributes the content output by the settop box 302 in a broadcast or multicast manner to allows the one or more than one user equipment 316 to 320 to receive the selected content, firstly, without the need for a settop box being in every room, secondly, without a TV being needed in every room and, thirdly, without a subscription or other fee having to be paid for multi-room content distribution.

Figure 4:
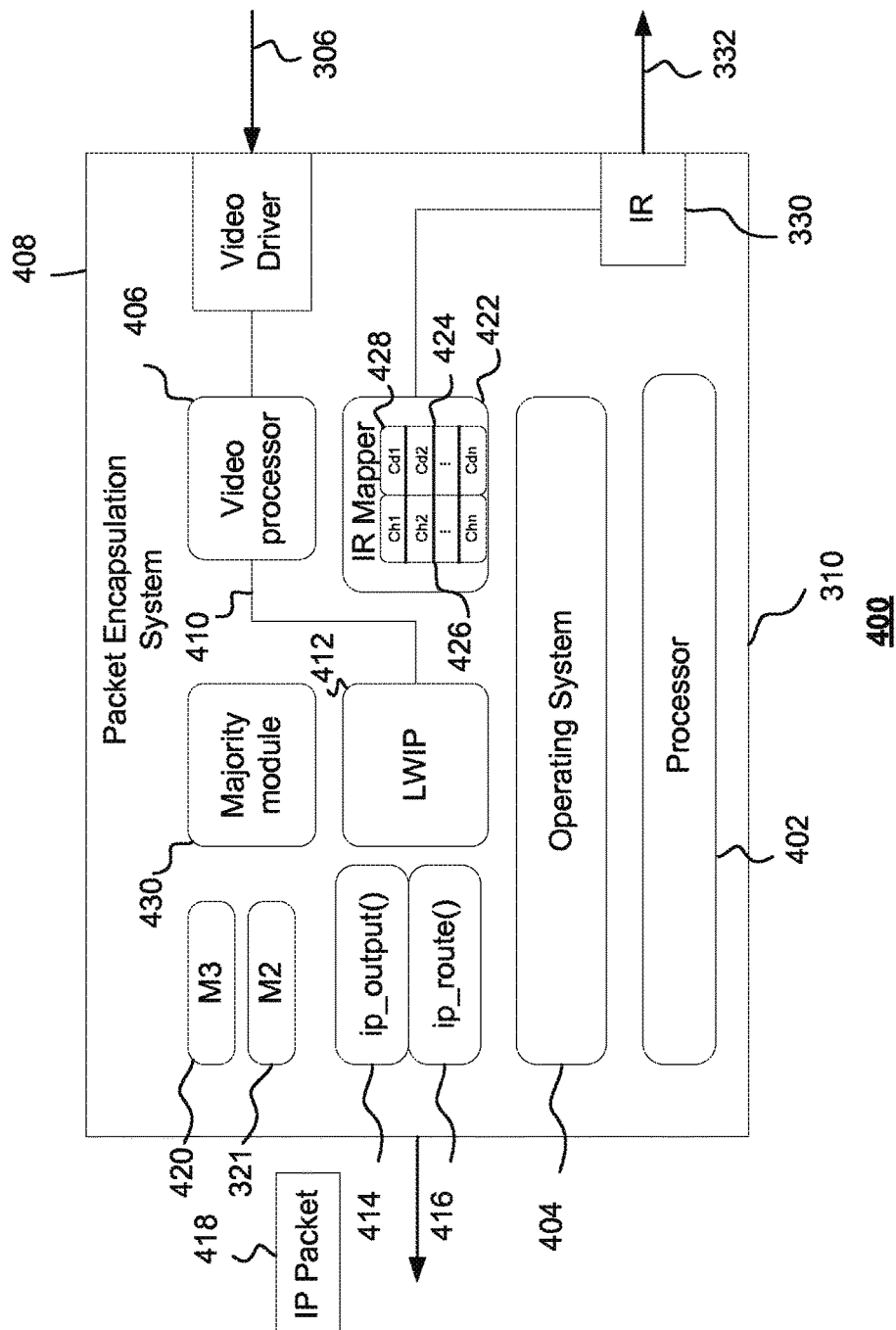
FIG. 4 shows a Packet Encapsulation System according to an embodiment.

FIG. 4 shows a more detailed view 400 of the Packet Encapsulation System 310. The PES 310 comprises one or more than one processor 402. The processor 402 can be a single core processor or a multicore processor. The processor 402 runs an operating system, such as, for example, an embedded real-time operating system 404. The processor 402 is arranged, via a video processor 406, to process the video signal 306 received via a video driver 408. The video driver 408 is configured to receive the video signal 306 and forward it to the video processor 406. The video processor 406 is arranged to produce a digital representation, that is, digital video data 410, of the received video signal such as, for example, a MPEG-4 representation. The video processor 406 can be realised in the form of software, hardware or a combination of software and hardware. The video driver 408 can be realised in the form of software, hardware or a combination of software and hardware. It will be appreciated that the digital video data 410, as well as the digital data encapsulated in the IP packets of the above embodiments, is an embodiment of TV content data. In essence, the TV content bearing signal is received by the settop. The TV content signal, derived from the TV content bearing signal, is output by the settop box for display on, for example, a TV. The TV content data, or digital video data, is derived from the TV content signal and is a digital representation of that TV content signal.

Once in a digital format, under the control of the operating system 404, the digital video data 410 is output to an IP packet constructor 412, which is configured to construct TCP/IP packets containing the digital video data 410. Embodiments of the IP packet constructor 412 can be realised using, for example, LightWeight IP, which is an open source TCP/IP stack for embedded systems. Embodiments can equally well, however, use some other TCP/IP stack implementation. The IP packet constructor 412 adds TCP and IP headers to the digital video data and outputs that packetized digital video data to two functions ip_output( ) 414 and ip_route( ) 416 that are responsible for outputting and routing the IP packets 418, such as IP packet 312, containing the packetized digital video data to the eNB 314.

In the distribution only embodiments, it is sufficient that the IP packets 418 are routed to the eNB 314. However, in the embodiments in which the one or more user equipment 316 to 320 can control the settop box 302, uplink communications from the one or more than one user equipment 316 to 320 is supported via at least an M3 interface emulator 420 and associated uplink channels to the eNB 314. The M3 interface emulator 420 is arranged to emulate the operation of the M3 interface, as defined in, for example, TS 36.444, v12.1.0, and, in particular, the signalling that occurs between the EPC and an eNB during an attach or connect procedure to allow the uplink to be established between the one or more than one user equipment 316 to 320 and the eNB 314.

An IR mapper 422, which can be implemented in software, is configured to map the data contained in the MBMS Service Counting Results Report message, described above with reference to FIG. 3, to one of the IR codes associated with controlling the settop box 302, including channel selection. It can be appreciated therefore that the IR mapper 422 comprises a table 424 that maps data 426 representing possible user equipment channel selections, taken from the MBMS Service Counting Results Report message, to corresponding IR codes 428 for selecting a desired channel of the settop box 302, or for otherwise controlling the settop box 302.

The IR code corresponding to the MBMS Service Counting Results Report message data is output to the IR emitter 330 for transmission as an IR signal 332, encoded with the IR code for a selected channel, to the settop box 302.

It can be appreciated that the embodiments herein support distributing content, using LTE broadcast technology and standards, that was initially delivered using different broadcast technology and standards such as, for example, one of the DVB standards.

Embodiments can be realised in which a number of user equipments 316 to 320 are consuming content distributed as indicated above. Furthermore, a plurality of such user equipments 316 to 320 can have the application that allows channel selection. If more than one user equipment makes a channel selection, a majority module 430 is configured to forward the channel selection data from the MBMS Service Counting Results Report message on a majority basis, that is, the channel most selected by the user equipment 316 to 320 is used as the basis for the IR code mapping by the IR mapper 422 to determine the IR code selected and output to the settop box 302 by the IR emitter 330.

Figure 5:
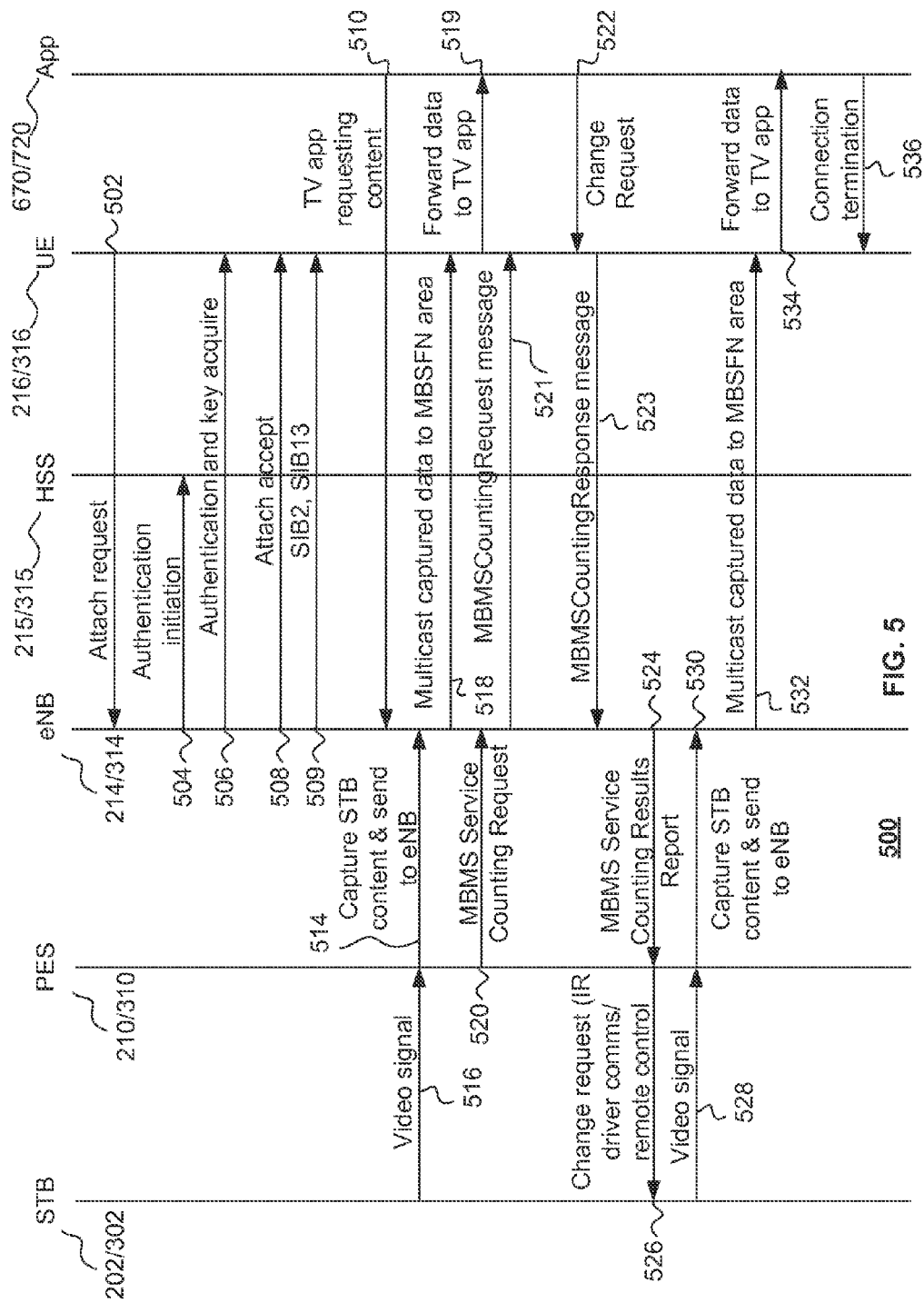
FIG. 5 illustrates a signalling diagram according to an embodiment.

FIG. 5 shows a signalling diagram 500 according to an embodiment. At 502, one or more than one user equipment 316 to 320 sends an attach request to the eNB 314. The eNB 314 authenticates the one or more than one user equipment 316 to 320 by sending, at 504, an authentication initiation to the HSS 315. On the assumption that the HSS authenticates the one or more than one user equipment 316 to 320, the eNB 314 forwards, at 506, an authentication key to the one or more than one user equipment 316 to 320. At 508, the eNB 314 forwards an attach accept to the one or more than one user equipment 316 to 320.

WHERE IS 518?

An indicated above, the one or more than one user equipment 316 to 320 is configured with an application for watching, for example, IP TV, which sends, at 510, a content request to the eNB 314, via one or more of the above messages such as, for example, in particular, the MBMSCountingResponse message.

The content request can be specific, that is, it can specify a desired channel in the message, or generic, which is interpreted as a request for whatever content is the current content being output by the settop box 302. The content request is forwarded and processed by the PES 310, which starts to capture, at 514, the video signal currently being output, at 516, by the settop box 302. Alternatively, the requested channel specified in the MBMS Service Counting Results Report message is processed by the IR mapper 422 and IR emitter 330 and then the video signal capture commences once the corresponding IR code has been output to the settop box 302.

The PES 310 receives and processes the video signal and, forwards it, using TCP/IP, to the eNB 314 at 514. At 518, the eNB 314 distributes, that is, multicasts or broadcasts, the captured to the MBSFN area, which allows the content to be received by all attached UEs of the one or more than one UE 316 to 320. The one or more than one UE 316 to 320 processes the multicast content and, at 519, forwards the content to the application for output.

At 520, the PES creates a pending or outstanding MBMS Service Counting Request by sending the eNB 314 an MSMB Service Counting Request message. It can be appreciated that the PES is emulating the messaging of the M2 interface.

At 521, the eNB creates a pending or outstanding MBM-SCountingRequest by sending the UE 316 to 320 an MSMBCountingRequest message.

Assume, a user equipment of the one or more than one user equipment 316 to 320 has received a change channel request at 522 from the application. The change channel request is forwarded to the eNB using, for example, the MBMSCountingResponse message as indicated above at 523. The eNB 314 is configured to output the data representing the channel selection contained within the MBMSCountingResponse message to the PES 310 at 524 in an MBMS Service Counting Results Report message over the M2 interface, where the message is received by the M2 interface emulator 321 of the PES.

The PES 310 process the channel data to determine corresponding a IR code to be selected and output by the IR mapper 422 and IR emitter 330. The IR code is output by the IR emitter 330, at 526, in response to which the video signal output by the settop box 302 changes at 528.

The video signal is captured, processed and forwarded, at 530, to the eNB 314 using TCP/IP. The TCP/IP data is broadcast or multicast into the MBSFN area, at 532, to allow all attached UE of the one or more than one UE 316 to 320 to receive the content. Again, IP packets bearing the content are received and, at 534, forwarded to the application executing at the UE for output.

Assuming that the application has received an input indicating that the content is no longer desired, the application merely terminates.

Although the signalling embodiment shown in FIG. 5 has been described above with reference to FIG. 3, embodiments are not limited thereto. Any one or more than one aspect of the signalling described with reference to and shown in FIG. 5, taken jointly and severally in any and all permutations, also applies to the embodiment described with reference to FIG. 2 or shown in FIG. 2.

Figure 6:
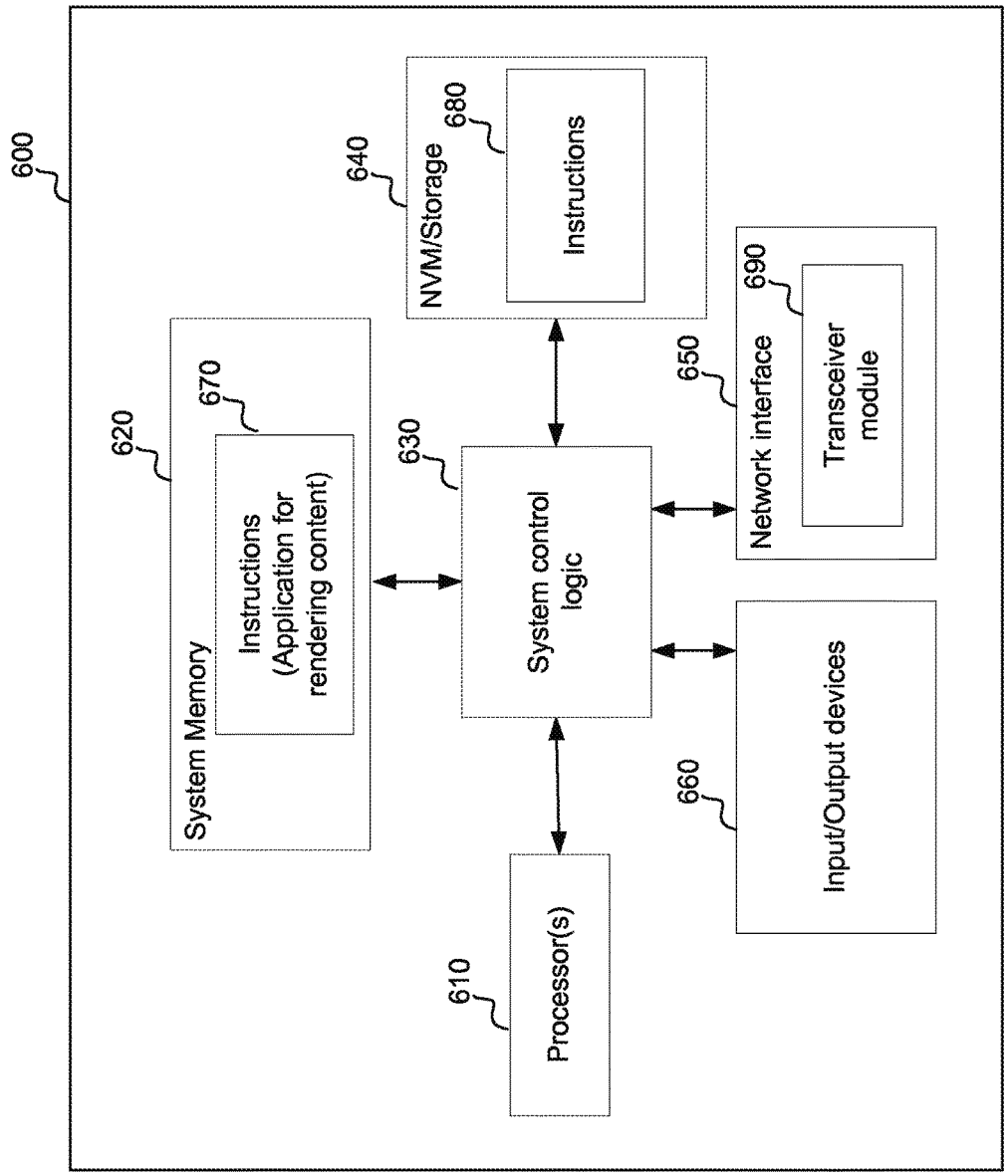
FIG. 6 depicts a system for realising a user equipment according to an embodiment.

FIG. 6 illustrates, for one embodiment, an example system 600 comprising one or more processor(s) 610, system memory 620, system control logic 620 coupled with at least one of the processor(s) 610, system memory 620, non-volatile memory (NVM)/storage 640, a network interface 650 and Input/Output devices 660. The system 600 is arranged to realise the processing described above and below.

Processor(s) 610 may include one or more single-core or multi-core processors. Processor(s) 610 may include any combination of general-purpose processors and/or dedicated processors (e.g., graphics processors, application processors, baseband processors, etc.). Processors 610 may be operable to carry out the signal processing described herein using suitable instructions or programs (i.e. operate via use of processor or other logic, instructions) 670. The instructions 670 may be stored in system memory 620, as system instructions, or additionally or alternatively may be stored in (NVM)/storage 640, as NVM instructions 680.

The instructions 670 represent the application used for rendering the settop box content and for issuing channel selection data and other settop box 202/302 control data to the eNB 214/314.

The system control logic 630 for one embodiment may include any suitable interface controllers to provide for any suitable interface to at least one of the processor(s) 610 and/or to any suitable device or component in communication with the system control logic 630.

The system control logic 630 for one embodiment may include one or more memory controller(s) to provide an interface to the system memory 620. The system memory 620 may be used to load and store data and/or instructions for system 600. The system memory 620 for one embodiment may include any suitable volatile memory, such as suitable dynamic random access memory (DRAM), for example.

The NVM/storage 640 may include one or more tangible, non-transitory computer-readable media used to store data and/or instructions, for example. The NVM/storage 640 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 640 may include a storage resource physically as a part of a device on which the system 600 is installed or it may be accessible by, but not necessarily a part of, the device. For example, the NVM/storage 640 may be accessed over a network via the network interface 690.

The system memory 620 and the NVM/storage 640 may respectively include, in particular, temporal and persistent copies of, for example, the instructions 670 and 680, respectively. Instructions 670 and 680 may include instructions that when executed by at least one of the processor(s) 610 result in the system 600 implementing a one or more of flow diagrams, methods, examples or embodiments described herein. In some embodiments, instructions 670 and 680, or hardware, firmware, and/or software components thereof, may additionally/alternatively be located in the system control logic 620, the network interface 650, and/or the processor(s) 610.

The network interface 650 may have a transceiver module 690 to provide a radio interface for the system 600 to communicate over one or more network(s) (e.g. wireless communication network) and/or with any other suitable device. The transceiver module 690 may be implement receiver module that performs the above processing of the received signals to realise interference mitigation. In various embodiments, the transceiver module 690 may be integrated with other components of system 600. For example, the transceiver module 690 may include a processor of the processor(s) 610, the memory of the system memory 620, and the NVM/Storage of NVM/Storage 640. The network interface 650 may include any suitable hardware and/or firmware. Network interface 650 may be operatively coupled to a plurality of antennas (not shown) to provide a multiple input, multiple output radio interface. The network interface 650 for one embodiment may include, for example, a network adapter, a wireless network adapter, a telephone modem, and/or a wireless modem.

For one embodiment, at least one of the processor(s) 610 may be packaged together with logic for one or more controller(s) of system control logic 630. For one embodiment, at least one of the processor(s) 610 may be packaged together with logic for one or more controllers of system control logic 630 to form a System in Package (SiP). For one embodiment, at least one of the processor(s) 610 may be integrated on the same die with logic for one or more controller(s) of system control logic 630. For one embodiment, at least one of the processor(s) 610 may be integrated on the same die with logic for one or more controller(s) of system control logic 630 to form a System on Chip (SoC).

In various embodiments, the I/O devices 660 may include user interfaces designed to enable user interaction with the system 600, peripheral component interfaces designed to enable peripheral component interaction with the system 600, and/or sensors designed to determine environmental conditions and/or location information related to the system 600.

Figure 7:
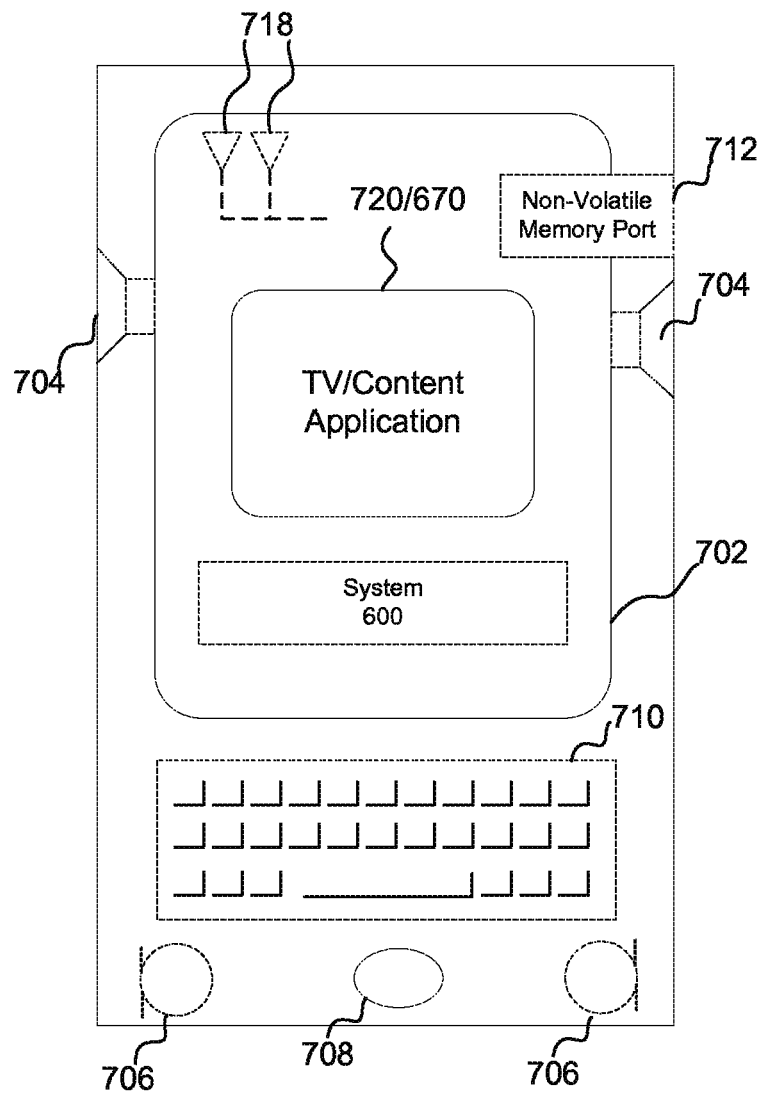
FIG. 7 illustrates an embodiment of a user equipment according to an embodiment.

FIG. 7 shows a user equipment 700, that is, an embodiment of the one or more than one user equipment 216 to 220 and 316 to 320 in which the system 600 is used.

In various embodiments, the user interfaces could include, but are not limited to, at least one or more of a display 702 (e.g., a liquid crystal display, a touch screen display, etc.), a speaker 704, a microphone 706, one or more cameras 708 (e.g., a still camera and/or a video camera), a flashlight (e.g., a light emitting diode flash), and a keyboard 710, taken jointly and severally in any and all permutations. The user interfaces are used to output possible channel selections retrieved from the InfoList, to receive channel selection inputs and other settop box 202/302 control inputs.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 450 to communicate with components of a positioning network, e.g., a global positioning system (GPS) satellite.

In various embodiments, the system 600 may be a mobile computing device such as, but not limited to, a laptop computing device, a tablet computing device, a netbook, a mobile phone, etc. In various embodiments, system 600 may have more or fewer components, and/or different architectures. Additionally, the mobile device 700 may comprise at least one or more of a memory port 712 for receiving additional memory (not shown), a graphics processor 714 and an application processor 716, taken jointly and severally in any and all permutations. The mobile device can comprise one, or more than one, antenna 718.

It can be appreciated that the user equipment 700 also comprises an instance 720 the application for outputting the content. The application 720 is also responsible for receiving inputs from a user interface, such as, for example, the keyboard 710, associated with controlling the application 720 and, ultimately, the settop box 202 and 302.

Figure 8A:
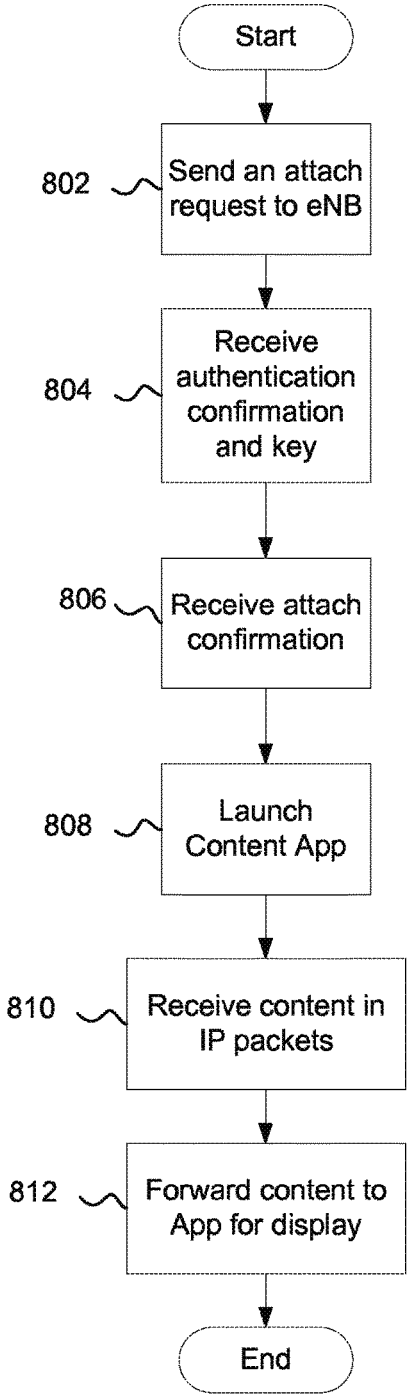
FIGS. 8A to 8C show flow charts for user equipment processing according to an embodiment.
Figure 8B:
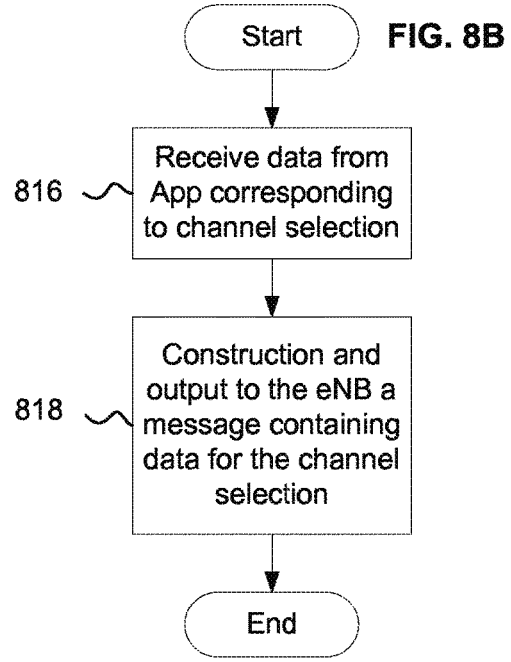
Figure 8C:
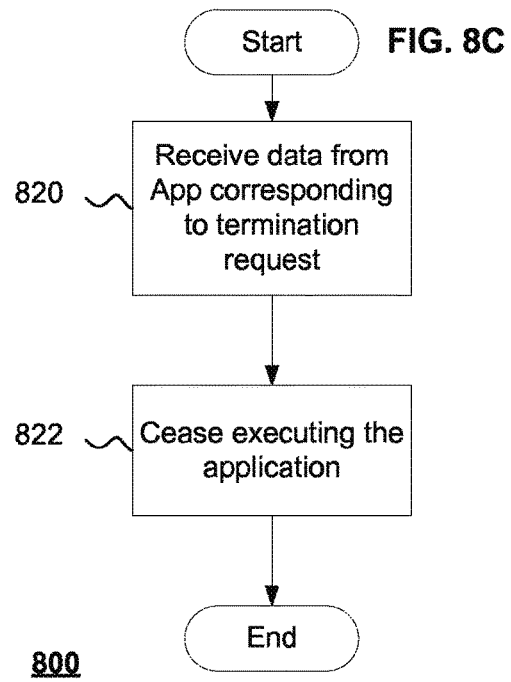

Referring to FIGS. 8A to 8C, there are shown flow charts 800 of processing performed by the one or more than one user equipment 216 to 220 and 316 to 320.

Referring to FIG. 8A, at 802, the one or more than one user equipment sends commences the LTE attach procedure by sending an attach request to the eNB. Assuming the one or more than one user equipment is authenticated by the HSS, the one or more than one user equipment receives authentication confirmation and an associated key at 804. At 806, the user equipment receives an attach confirmation. The TV application is launched at 808. Alternatively, the TV application could already be executing. IP packets, multicast by the eNB 314 into a respective MBSFN area, containing the content are received at 810. The data representing the content carried by the IP packets is extracted at 812 and output for processing by the TV application.

Referring to FIG. 8B, assuming that the user equipment is already consuming and displaying content, the user equipment receives, at 816, an interrupt pointing to data from the TV application corresponding to a channel selection. The user equipment constructs and outputs, at 818, a message to the eNB containing an indication of the data corresponding to the channel selection. Embodiments can be realised in which the message is a MBMSCoutingResponse message.

Referring to FIG. 8C, assuming, again, that the user equipment already has the TV application executing, at 820, the application receives a termination input via the user interface. The application outputs that termination request to the UE, which merely terminates executing the application. It will be noted that merely terminating executing the application does not interfere with any other UEs consuming the broadcast content within the MBSFN area. Propagating a signal through to the settop box 202 or 302 to switch off or otherwise cease outputting content would interfere with any other UE consuming that content.

It will be appreciated that the processing described above and shown in FIGS. 8A to 8C can be realised in the form of software comprising instructions arranged, when executed, to perform the above processing.

Figure 9:
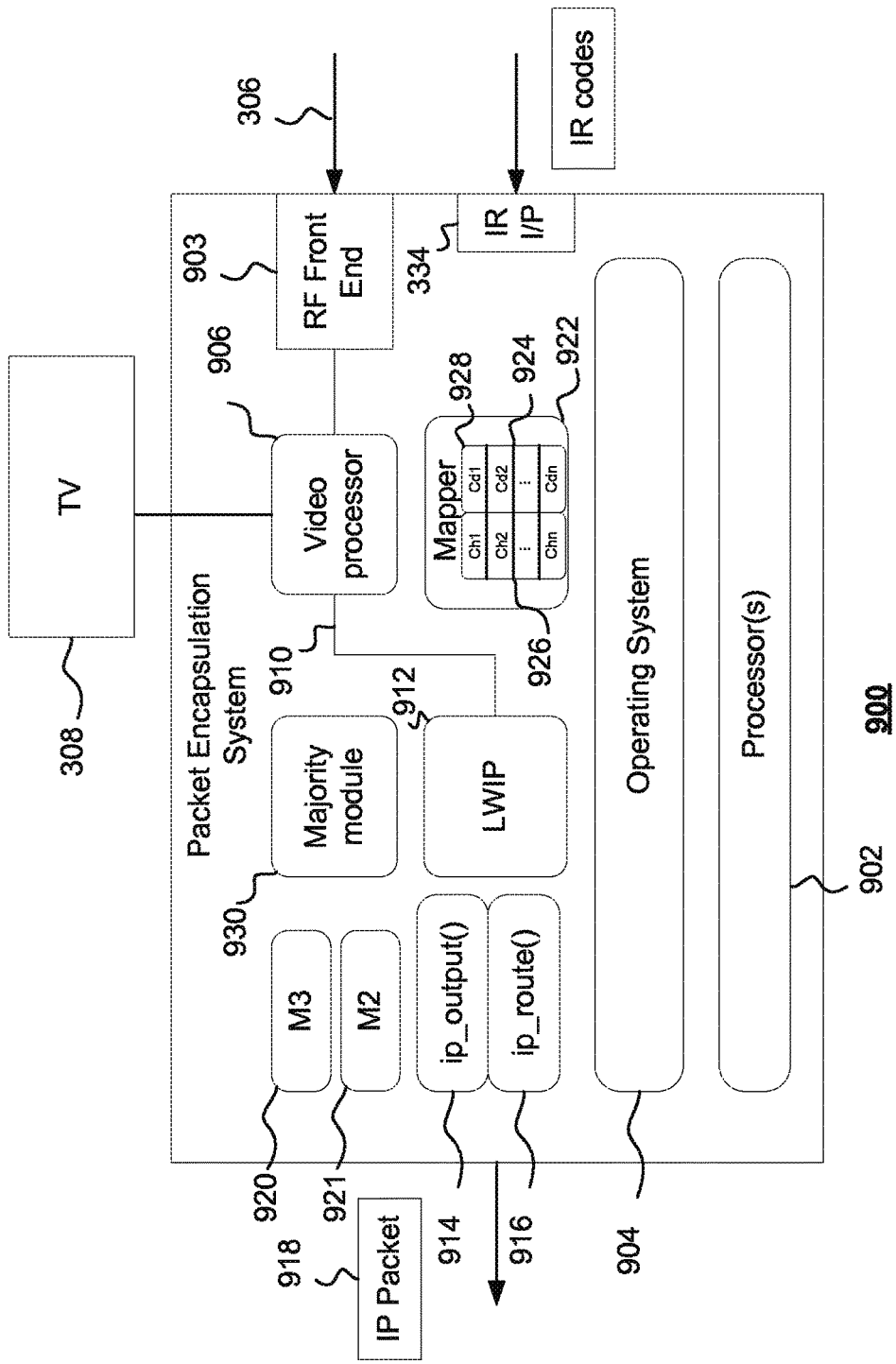
FIG. 9 depicts a settop box according to an embodiment.

Referring to FIG. 9, there is shown a settop box 900 according to an embodiment. The settop box 902 comprises one or more than one processor 902. The processor 902 can be a single core processor or a multicore processor. The processor 902 runs an operating system, such as, for example, an embedded real-time operating system 904. The processor 902 is arranged, via a video processor 906, to process the video signal 306 received, via a cable TV input or a coaxial cable from antenna of a satellite dish (not shown), by an RF front end 903, in the case of satellite TV, or an electrical or optical interface in the case of cable TV. The RF front end 903, or other receiving entity, is configured to receive the video signal 306 and forward it to the video processor 906. The video processor 906 is arranged to produce a video signal that can be output for display on a TV 308 such as, for example, an S-video signal or an HDMI signal. The video processor 906 can be realised in the form of software, hardware or a combination of software and hardware.

The video processor 906 is also responsible for producing a version of the video signal in a digital format, under the control of the operating system 904. The digital video data 910 is output to an IP packet constructor 912, which is configured to construct TCP/IP packets containing the digital video data 910. Embodiments of the IP packet constructor 912 can be realised using, for example, LightWeight IP (LWIP), which is an open source TCP/IP stack for embedded systems. Embodiments can equally well, however, use some other TCP/IP stack implementation. The IP packet constructor 912 adds TCP and IP headers to the digital video data and outputs that packetized digital video data to two functions; namely, ip_output( ) 914 and ip_route( ) 916 that are responsible for outputting and routing the IP packets 918, such as IP packet 312, containing the packetized digital video data to the eNB 314.

In the distribution only embodiments, it is sufficient that the IP packets 918 are routed to the eNB 314. However, in the embodiments in which the one or more user equipment 316 to 320 can control the settop box 202 or 302, uplink communications from the one or more than one user equipment 316 to 320 is supported via at least an M3 interface emulator 920 and associated uplink channels to the eNB 314. The M3 interface emulator 920 is arranged to emulate the signalling that occurs between the EPC and an eNB during an attach or connect procedure to allow the uplink to be established between the one or more than one user equipment 316 to 320 and the eNB 314.

A mapper 922, which can be implemented in software, is configured to map the data contained in any received MBMS Service Counting Results Report message to one of the codes associated with controlling the settop box 302, including channel selection. It can be appreciated therefore that the mapper 922 comprises a table 924 that maps data 926 representing possible user equipment channel selections, taken from the MBMS Service Counting Results Report message, to corresponding codes 928 for selecting a desired channel of the settop box 302, or for otherwise controlling the settop box 302.

The code corresponding to the MBMS Service Counting Results Report message data is extracted and used to control the settop box in a manner comparable to the IR receiver 334 receiving an IR code that is converted to a useable form for controlling the settop box.

It can be appreciated that the embodiments herein support distribution of content, using LTE broadcast technology and standards, that was initially delivered using different broadcast technology and standards such as, for example, one of the DVB standards.

Embodiments can be realised in which a number of user equipments 316 to 320 are consuming content distributed as indicated above. Furthermore, a plurality of such user equipments 316 to 320 can have the application that allows channel selection. As indicated above, any such channel selection is via an MBMSCountingResponse message from the one or more than one user equipment to the eNB, which, in turn, constructs an MBMS Service Counting Results Report message containing the one or more than one channel selection via the M2 interface emulator 921. If more than one user equipment makes a channel selection, a majority module 930 is configured to forward the channel selection data from the MBMS Service Counting Results Report message on a majority basis, that is, the channel most selected by the user equipment 316 to 320 is used as the basis for the code mapping by the mapper 922 to determine the code selected and used for controlling the settop box 302.

A further embodiment can alternatively, or additionally to any of the foregoing, be realised in which the eNB 314 outputs a request to the one or more user equipment 316 to 320 to provide an indication of a required service, that is, required channel in the present embodiment. Embodiments can be realised in which the request is issued using an LTE RRCCountingRequest message, sent by the eRRC 328, to the application for rending distributed content executing on the one or more than one user equipment 316 to 320. The MBMSCountingRequest message is output in response the M2 emulator 921 issuing an MBMS Service Counting Request to the eNB. The one or more than one user equipment 316 to 320 can respond to the request via the application providing an indication of a desired service, that is, channel in the present embodiment, using an LTE RRC MBMSCountingResponse message. Having extracted the data representing the desired service from the MBMSCountingResponse message, that data, or the majority of instances of that data, is sent to the mapper 922 to determine the corresponding code to be selected and used for controlling the settop box as indicated in any of the embodiments described above.

Figure 10:
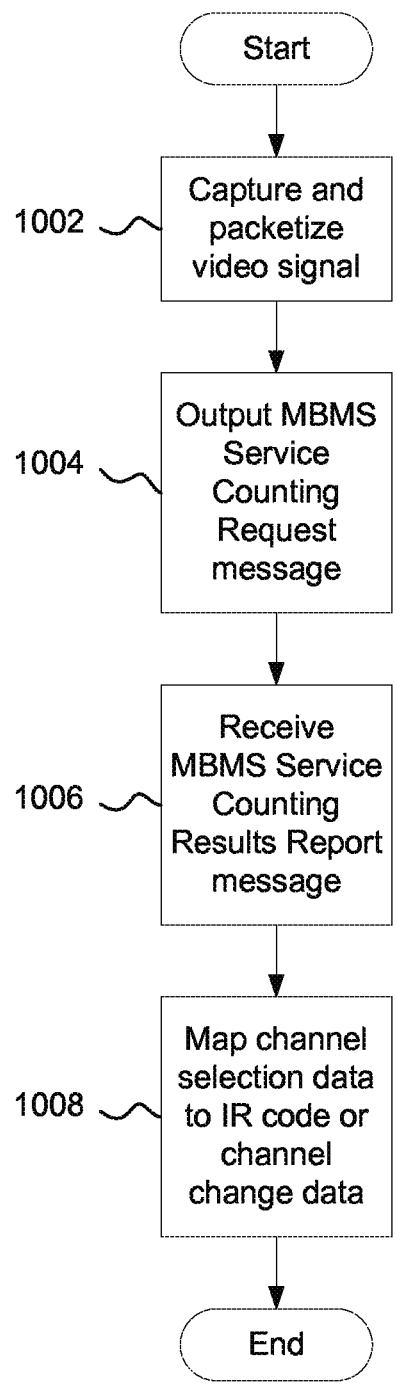
FIG. 10 shows a flow chart of processing by a settop box according to an embodiment.

Referring to FIG. 10, there is shown a flow chart 1000 for processing performed by the PES 210 and 320. The video signal output by the video processor is captured and packetized at 1002. The PES outputs, via the M2 interface emulator, an MBMS Service Counting Request message at 1004. The PES, again, via the M2 interface module, receive an MBMS Service Counting Results Report message containing channel selection data at 1006. The PES, via the mapper, maps the channel selection data to either an IR code 428, or directly to a channel change code 928, to be used in changing the current channel being output by the settop box 202 or 302. It will be appreciated that the processing undertaken by the PES, or any element thereof, can be implemented in software, hardware or a combination of software and hardware.

Figure 11:
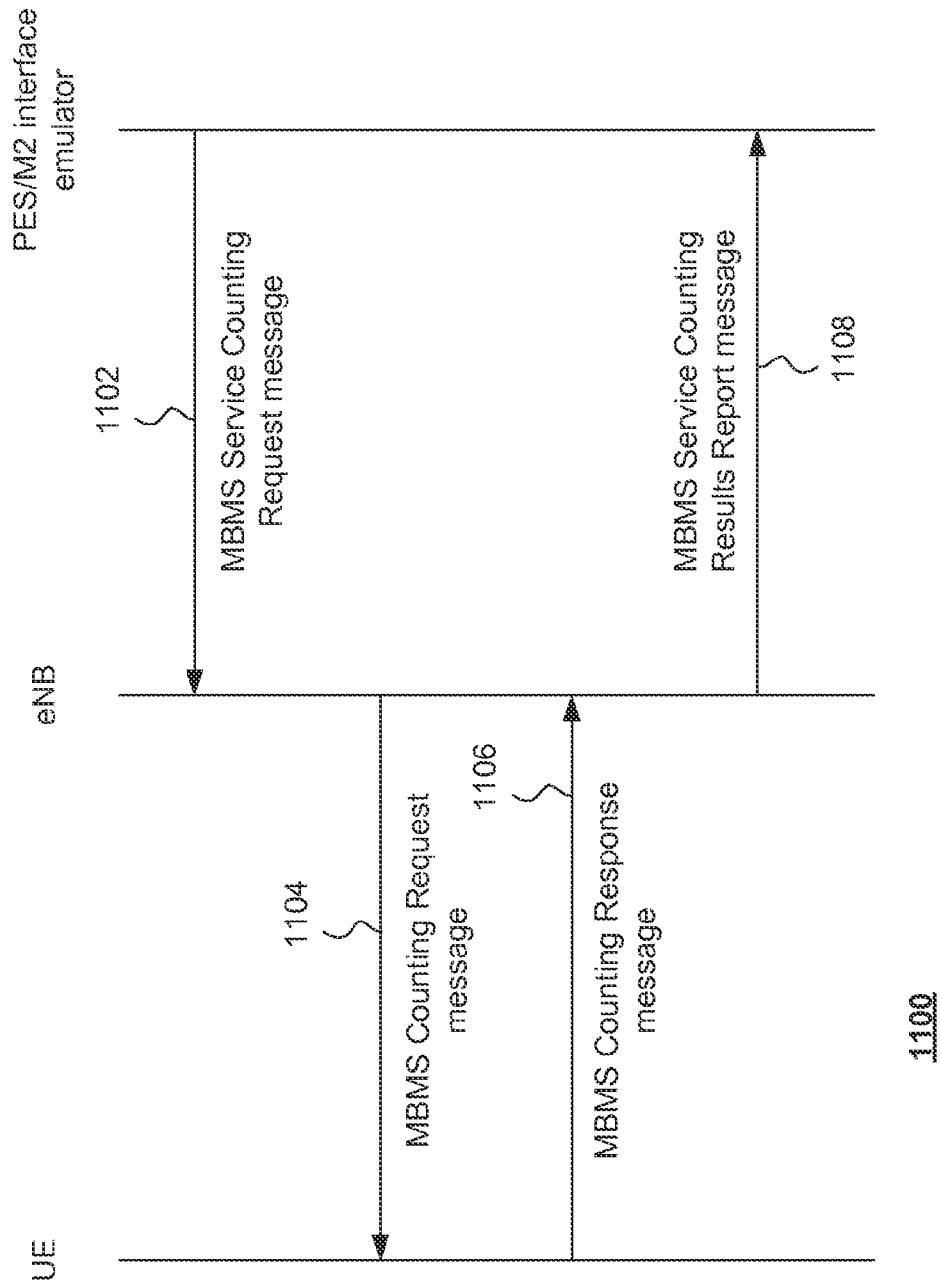
FIG. 11 illustrates messaging signalling according to an embodiment.

Referring to FIG. 11, there is shown a view 1100 of signalling between the PES, or, more particularly, the M2 interface emulator, the eNB and the UE. The M2 interface emulator issues, at 1102, the MBMS Service Counting Request message to the eNB. The eNB, at 1104, in response, issues the MBMS Counting Request message to the UE, or, more particularly, broadcasts that to the MBSFN area so that it can be received by any attached UEs. In response to receiving the MBMS Counting Request message, and, in particular, in response to receiving channel selection data from the application, the UE sends, at 1106, the MBMS Counting Response message, containing the channel selection data, to the eNB. The eNB transparently forwards, at 1108, the channel selection data contained in the MBMS Counting Response message, over the M2 interface, via the MBMS Service Counting Results Report message to the M2 interface emulator.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or machine readable storage such as, for example, DVD, memory stick or solid state medium. It will be appreciated that a storage device and storage medium are embodiments of non-transitory machine-readable storage that are suitable for storing a program or programs comprising instructions that, when executed, implement embodiments described and claimed herein. Accordingly, embodiments provide machine executable code for implementing a system, device, apparatus or method as described herein or as claimed herein and non-transitory machine readable storage storing such a program. Still further, such programs may be conveyed electronically via any medium such as a communication signal carried over a wired or wireless connection and embodiments suitably encompass the same.

Any such hardware can take the form of a processor, suitably programmable, such as for example, a programmable general purpose processor designed for mobile devices, a FPGA, or an ASIC. The foregoing can constitute embodiments of processing circuitry to perform the functions of the above examples and embodiments. Any such hardware can also take the form of a chip or chip set arranged to operate according to any one or more of the above described diagrams, such diagrams and associated descriptions being taken jointly or severally in any and all permutations.

Although the examples and embodiments have been described separately with respect to their accompanying drawings, embodiments are not limited thereto. Embodiments can be realised in which the embodiments or examples associated with the figures can be taken jointly and severally in any and all permutations. For example, the features of FIG. 1, and/or the features of the description of FIG. 1, can be taken together with the features of FIG. 2 or the description of FIG. 2 and so on.

Where variations of examples or embodiments have been presented as being at least a member of an enumerated list, either with or without the accompanying language "taken jointly or severally in any and all permutations", it is clear that all permutations of such enumerated list members are contemplated, which is made more emphatic by the accompanying language "taken jointly and severally in any and all permutations" or, where appropriate, "taken jointly and severally in any and all combinations".

Embodiments of the present invention can be applied to, for example, broadband wireless wide area networks (WWANs). However, embodiments are not limited thereto and can be applied to other types of wireless networks where the same or similar advantages may be realised. Such networks specifically include, if applicable, wireless local area networks (WLANs), wireless personal area networks (WPANs) and/or wireless metropolitan area networks (WMANs) such. Further, embodiments may be realised using one or a number of access and modulation techniques, such as, for example, Orthogonal Frequency Division Multiplexing (OFDM) or multi-user OFDM, otherwise referred to as Orthogonal Frequency Division Multiple Access (OFDMA) and, for example, other air interfaces including single carrier communication channels or a combination of protocols or other air interfaces where suitably applicable.

Furthermore, embodiments may be used in a variety of applications including transmitters and receivers of a radio system, although the present invention is not limited in this respect. Radio systems specifically included within the scope of embodiments of the present invention include, but are not limited to, network interface cards (NICs), network adaptors, fixed or mobile client devices, relays, base stations, femtocells, gateways, bridges, hubs, routers, access points, or other network devices. Further, the radio systems within the scope of embodiments of the invention may be implemented in cellular radiotelephone systems, satellite systems, two-way radio systems as well as computing devices including such radio systems including personal computers (PCs), tablets and related peripherals, personal digital assistants (PDAs), personal computing accessories, hand-held communication devices and all systems which may be related in nature and to which the principles of the inventive embodiments could be suitably applied.

Still further, the above embodiments have been described with reference to a 3GPP LTE context. However, embodiments are not limited to such a context. Embodiments can be realised within the context of another type of network, such as, for example, an IEEE 802.11 or an IEEE 801.16 wireless network, or any other type of network.

Embodiments can be realised according to any of the following clauses 1 to 50 taken jointly and severally in any and all permutations:

An apparatus for distributing content, the apparatus comprising:
a video processor configured to process a TV content signal, from a receiver configured to received and process a TV content bearing signal, to output the TV content signal;
processing circuitry configured to construct multicast IP packets containing TV content data representing the TV content signal; and
a transmitter configured to output the multicast IP packets to an eNB for multicasting the TV content data to at least one user equipment.

The apparatus of clause 1, further comprising an M3 interface emulator configured to emulate M3 interface response signalling, to the eNB, associated with attaching the at least one user equipment to the eNB.

The apparatus of clause 2, in which the M3 interface emulator is arranged to instruct the eNB to reserve radio resources associated with multicasting the TV content data; the radio resources being useable to wirelessly broadcast the TV content data to the at least one user equipment.

The apparatus of any preceding clause, further comprising an M2 interface emulator configured to emulate an M2 interface between the eNB and an EPC.

The apparatus of clause 4, in which the M2 emulator is configured to issue a MBMS Service Counting Request message to the eNB.

The apparatus of either of clauses 4 and 5, in which the M2 emulator is configured to receive an MBMS Service Counting Results Report from the eNB containing data associated with an operation of an application of the at least one with user equipment.

The apparatus of any preceding clause, further comprising
messaging circuitry configured to receive and process a message associated with the at least one user equipment; the message containing data associated with further TV content data,
mapping circuitry configured to map the data associated with the further TV content data to a code for accessing that further TV content data; and
an emitter for outputting the code for accessing the further TV content data.

The apparatus of clause 7, in which the code is an infrared code associated with controlling a current TV content channel selection of the receiver and in which the emitter is an infrared emitter configured to output an infrared signal to instruct the receiver to output the further TV content associated with the infrared signal.

The apparatus of any preceding clause, further comprising
a message processor configured to receive a plurality of messages associated with respective user equipments associated with the eNB; each message containing data associated with respective further TV content data; and
a mapping processor configured to select one of the data associated with respective further TV content data for output to a mapping circuitry configured to map the selected data to a code for accessing the respective further TV content data.

The apparatus of any preceding clause, in which the processing circuitry configured to construct multicast IP packets containing the TV content data comprises an IP processor configured to encapsulate the TV content data according to an LTE multicast IP protocol of the eNB.

The apparatus of clause 10, in which the IP processor configured to encapsulate the TV content data according to the IP protocol of an eNB is configured to encapsulate the TV content data according to a broadcast IP protocol.

The apparatus of clause 11, in which the broadcast IP protocol is an IP multicast protocol producing IP multicast packets for output to the eNB or an evolved Multimedia Broadcast Multicast Service (eMBMS).

A content broadcast system for distributing audio/visual content to one or more than one user equipment, the system comprising
a set-top box having
a receiver for receiving a signal bearing audio/visual content according to a subscription service,
a video processor for processing the signal and
a first output for outputting the audio/visual content for display or other rendering on a device for playing the audio/visual content,
a connector configured to direct the content to at least the device for playing the audio/visual content;
an IP packet processor configured to receive and process the audio/visual content to produce IP multicast packets for carrying the content to a small-cell or home eNB via an M1 interface and for outputting associated control signals via an M3 interface for attaching the one or more than one user equipment to the eNB;

a small-cell or home eNB configured to receive and distribute the IP multicast packets via a respective wireless network.

The apparatus of clause 13, in which the set-top box is arranged to receive a wireless signal and in which the signal bearing audio/visual content is a wireless signal.

The apparatus of clause 13, in which the set-top box is arranged to receive a wireless signal transmitted by a satellite or a wireless signal transmitted by a ground-based transmitter.

The apparatus of clause 13, in which the set-top box is arranged to receive the signal bearing audio/visual content via a medium.

The apparatus of clause 13, in which the medium is an electrical conductor or an optical fibre.

A user equipment for consuming TV content, the user equipment comprising:

a multicast IP packet processor configured to receive multicast IP packets containing TV content broadcast by a respective eNB;

an application processor configured to execute an application for rendering the TV content via a display; the application being further configured to respond to actuation of a user interface of the user equipment by outputting data associated with that actuation; and a messaging processor configured to construct a message containing the data associated with the actuation and to output the message for transmission to the eNB.

The user equipment of clause 18, in which the application is configured to respond to a channel selection via the user interface of the user equipment by outputting data associated with that channel selection; and in which the messaging processor is configured to construct a message containing the data representing the channel selection and to output the message for transmission to the eNB.

An apparatus for distributing content, the apparatus comprising:

means to process a TV content signal, from a receiver configured to received and process a TV content bearing signal, to output the TV content signal;

means to construct multicast IP packets containing TV content data representing the TV content signal; and means to output the multicast IP packets to an eNB for multicasting the TV content data to at least one user equipment.

The apparatus of clause 20, further comprising an M3 interface emulator comprising means to emulate M3 interface response signalling, to the eNB, associated with attaching the at least one user equipment to the eNB.

The apparatus of clause 21, in which the M3 interface emulator comprises means to instruct the eNB to reserve radio resources associated with multicasting the TV content data; the radio resources being useable to wirelessly broadcast the TV content data to the at least one user equipment.

The apparatus of any of clauses 20 to 22, further comprising an M2 interface emulator comprising means to emulate an M2 interface between the eNB and an EPC.

The apparatus of any of clauses 20 to 23, further comprising an M2 emulator comprising means to issue a MBMS Service Counting Request message to the eNB.

The apparatus of any of clauses 20 to 24, further comprising an M2 emulator comprising means to receive an MBMS Service Counting Results Report from the eNB containing data associated with an operation of an application of the at least one with user equipment.

The apparatus of any of clauses 20 to 26, further comprising messaging circuitry means to receive and process a message associated with the at least one user equipment; the message containing data associated with further TV content data, mapping circuitry means to map the data associated with the further TV content data to a code for accessing that further TV content data; and an emitter for outputting the code for accessing the further TV content data.

The apparatus of clause 26, in which the code is an infrared code associated with controlling a current TV content channel selection of the receiver and in which the emitter is an infrared emitter configured to output an infrared signal to instruct the receiver to output the further TV content associated with the infrared signal.

The apparatus of any of clauses 20 to 27, further comprising a message processor means to receive a plurality of messages associated with respective user equipments associated with the eNB; each message containing data associated with respective further TV content data; and a mapping processor means to select one of the data associated with respective further TV content data for output to a mapping circuitry configured to map the selected data to a code for accessing the respective further TV content data.

The apparatus of any of clauses 20 to 28, in which the processing circuitry means to construct multicast IP packets containing the TV content data comprises an IP processor means to encapsulate the TV content data according to an LTE multicast IP protocol of the eNB.

The apparatus of clause 29, in which the IP processor means to encapsulate the TV content data according to an IP protocol of an eNB is configured to encapsulate the TV content data according to a broadcast IP protocol.

The apparatus of clause 30, in which the broadcast IP protocol is an IP multicast protocol producing IP multicast packets for output to the eNB or an evolved Multimedia Broadcast Multicast Service (eMBMS).

A content broadcast system for distributing audio/visual content to one or more than one user equipment, the system comprising means for receiving a signal bearing audio/visual content according to a subscription service, means for processing the signal and means for outputting the audio/visual content for display or other rendering on a device for playing the audio/visual content, means for directing the content to at least the device for playing the audio/visual content;

means for receiving and processing the audio/visual content to produce IP multicast packets for carrying the content to a small-cell or home eNB via an M1 interface and for outputting associated control signals via an M3 interface for attaching the one or more than one user equipment to the eNB;

a small-cell or home eNB configured to receive and distribute the IP multicast packets via a respective wireless network.

The apparatus of clause 32, in which means for receiving the signal bearing audio/visual content comprises means for receiving a wireless signal.

The apparatus of clause 33, in which the wireless signal is a wireless signal transmitted by a satellite or a wireless signal transmitted by a ground-based transmitter.

The apparatus of clause 32, in which the means for receiving the signal bearing the audio/visual content comprises means for receiving the signal bearing audio/visual content via a medium.

The apparatus of clause 35, in which the medium is an electrical conductor or an optical fibre.

A method for distributing content, the method comprising:
processing a TV content signal, from a receiver configured to received and process a TV content bearing signal, and outputting the TV content signal;
constructing multicast IP packets containing TV content data representing the TV content signal; and
outputting the multicast IP packets to an eNB for multicasting the TV content data to at least one user equipment.

The method of clause 37, further comprising emulating M3 interface response signalling, to the eNB, associated with attaching the at least one user equipment to the eNB.

The method of clause 38, in which the emulating comprises instructing the eNB to reserve radio resources associated with multicasting the TV content data; the radio resources being useable to wirelessly broadcast the TV content data to the at least one user equipment.

The method of any of clause 37 to 39, further comprising emulating an M2 interface between the eNB and an EPC.

The method of clause 40, in which emulating the M2 interface comprises issuing a MBMS Service Counting Request message to the eNB.

The method of either of clauses 40 and 41, comprising receiving an MBMS Service Counting Results Report from the eNB containing data associated with an operation of an application of the at least one with user equipment.

The method of any of clauses 37 to 42, further comprising
receiving and processing a message associated with the at least one user equipment; the message containing data associated with further TV content data,
mapping the data associated with the further TV content data to a code for accessing that further TV content data; and
outputting the code for accessing the further TV content data.

The method of clause 43, in which the code is an infrared code associated with controlling a current TV content channel selection of the receiver and in which the emitter is an infrared emitter configured to output an infrared signal to instruct the receiver to output the further TV content associated with the infrared signal.

The method of any of clauses 37 to 44, further comprising
receiving a plurality of messages associated with respective user equipments associated with the eNB; each message containing data associated with respective further TV content data; and
selecting one of the data associated with respective further TV content data for output to a mapping circuitry configured to map the selected data to a code for accessing the respective further TV content data.

The method of any of clause 37 to 45, comprising encapsulating the TV content data according to an LTE multicast IP protocol of the eNB.

The method of clause 46, in which encapsulating the TV content data according to the IP protocol of an eNB comprise encapsulating the TV content data according to a broadcast IP protocol.

The method of clause 47, in which the broadcast IP protocol is an IP multicast protocol producing IP multicast packets for output to the eNB or an evolved Multimedia Broadcast Multicast Service (eMBMS).

A computer executable program comprising instructions arranged, when executed by at least one processor, to implement a method of any of clauses 37 to 48.

Non-transitory computer readable storage storing a computer executable program of clause 49.

The invention claimed is:

1. An apparatus for distributing content, the apparatus comprising:
a video processor to process a television (TV) content signal generated from a TV content bearing signal transmitted over a subscriber network to a user premise, wherein the TV content signal is configured for playback on a subscriber network enabled user equipment located at the user premise;
processing circuitry to construct multicast Internet Protocol (IP) packets containing TV content data representing the TV content signal, wherein the multicast IP packets are constructed at the user premise;
a transmitter to output the multicast IP packets to an evolved Node B (eNB) located at the user premise for wirelessly multicasting the TV content data to at least one non-subscriber user equipment located at the user premise;
messaging circuitry located at the user premise to receive from the eNB and process a multimedia broadcast multicast services (MBMS) Service Counting Results Report message associated with the at least one non-subscriber user equipment, the MBMS Service Counting Results Report message containing data associated with a further TV content signal;
mapping circuitry located at the user premise to map the data associated with the further TV content signal to a code for accessing the further TV content signal; and
an emitter for outputting the code for accessing the further TV content signal.

2. The apparatus of claim 1, further comprising an M3 interface emulator to emulate M3 interface response signaling, to the eNB, associated with attaching the at least one non-subscriber user equipment to the eNB.

3. The apparatus of claim 2, in which the M3 interface emulator is to instruct the eNB to reserve radio resources associated with multicasting the TV content data; the radio resources being useable to wirelessly broadcast the TV content data to the at least one non-subscriber user equipment.

4. The apparatus of claim 1, further comprising an M2 interface emulator to emulate an M2 interface between the eNB and an evolved packet core (EPC).

5. The apparatus of claim 1, further comprising an M2 emulator to issue an MBMS Service Counting Request message to the eNB.

6. The apparatus of claim 1, further comprising an M2 emulator to receive the MBMS Service Counting Results Report message from the eNB containing data associated with an operation of an application of the at least one non-subscriber user equipment, wherein the MBMS Service Counting Results Report message is generated by the eNB from an MBMSCounting message.

7. The apparatus of claim 1, wherein the code is an infrared code associated with controlling a current TV content channel selection of a receiver and the emitter is an infrared emitter to output an infrared signal associated with the infrared code to instruct the receiver to output the further TV content signal associated with the infrared signal.

8. The apparatus of claim 1, further comprising
a message processor to receive a plurality of MBMS messages associated with respective non-subscriber user equipment associated with the eNB, each MBMS message containing data associated with respective further TV content signal; and
a mapping processor to select one of the data associated with respective further TV content data for output to the mapping circuitry to map the selected data to a code for accessing the respective further TV content signal.

9. The apparatus of claim 1, wherein the processing circuitry comprises an IP processor to encapsulate the TV content data according to an Long Term Evolution (LTE) multicast IP protocol of the eNB.

10. The apparatus of claim 1, wherein the processing circuitry comprises an IP processor to encapsulate the TV content data according to a broadcast IP protocol.

11. The apparatus of claim 1, wherein the TV content data is wirelessly broadcasted to the at least one non-subscriber user equipment via a multicast protocol associated with a Multimedia Broadcast Multicast Service (MBMS) or an evolved Multimedia Broadcast Multicast Service (eMBMS).

12. A content broadcast system for distributing audio/visual content to one or more than one non-subscriber user equipment located at a user premise, the content broadcast system comprising
a set-top box having:
a receiver to receive a signal bearing audio/visual content signal, wherein the signal is transmitted over a subscriber network to the user premise where the set-top box is located,
a video processor to process the signal to extract the audio/visual content, and
a first output to output the audio/visual content for display or other rendering on a subscriber network enabled device located at the user premise for playing the audio/visual content,
a connector to direct the audio/visual content to at least the subscriber network enabled device for playing the audio/visual content;
a packet encapsulation system to receive and process the audio/visual content to produce IP multicast packets for carrying the audio/visual content to a small-cell eNB via an M1 interface and to output associated control signals via an M3 interface for attaching the one or more than one non-subscriber user equipment to the small-cell eNB; to receive and process, by messaging circuitry located at the user premise, a second multimedia broadcast multicast services (MBMS) message from the small-cell eNB and associated with the one or more than one non-subscriber user equipment, the second MBMS message containing data associated with a further TV content signal; to map, by mapping circuitry located at the user premise, the data associated with the further TV content signal to a code for accessing the further TV content signal; and to output the code for accessing the further TV content signal through the set-top box; and
the small-cell eNB located at the user premise and to receive and wirelessly broadcast the IP multicast packets to the one or more than one non-subscriber user equipment located at the user premise via a respective wireless network, to receive a first MBMS message containing data associated with the further TV content signal, and to generate, based on the first MBMS message, the second MBMS message different from the first MBMS message.

13. The content broadcast system of claim 12, wherein the set-top box is arranged to receive a wireless signal and in which the signal bearing audio/visual content is the wireless signal.

14. The content broadcast system of claim 12, wherein the set-top box is to receive a wireless signal transmitted by a satellite or a wireless signal transmitted by a ground-based transmitter.

15. The content broadcast system of claim 12, wherein the set-top box is to receive the signal bearing audio/visual content via a medium comprising an electrical conductor or an optical fiber.

16. A non-subscriber user equipment for consuming TV content, the non-subscriber user equipment comprising:
a multicast IP packet processor to receive multicast IP packets containing TV content broadcasted by an eNB, wherein the TV content is derived from a TV content signal transmitted over a subscriber network to a user premise, and wherein the multicast IP packets are constructed at the user premise;
an application processor to execute an application for rendering the TV content via a display, the application being further to respond to actuation of a user interface of the non-subscriber user equipment by outputting data associated with that actuation; and
a messaging processor to construct a first multimedia broadcast multicast services (MBMS) message containing the data associated with the actuation for a further TV content signal and to output the first MBMS message for transmission to the eNB and further to a packet encapsulation system, wherein the packet encapsulation system is to receive and process, by messaging circuitry located at the user premise, a second MBMS message from the eNB generated based on the first message; to map, by mapping circuitry located at the user premise, the data associated with the actuation for the further TV content signal to a code for accessing the further TV content signal; and to output the code for accessing the further TV content signal through a set-top box.

17. The non-subscriber user equipment of claim 16, wherein the application is to respond to a channel selection via the user interface of the non-subscriber user equipment by outputting data associated with the channel selection; and wherein the messaging processor is to construct the first MBMS message containing the data representing the channel selection and to output the first MBMS message for transmission to the eNB.

18. The non-subscriber user equipment of claim 16, wherein the non-subscriber user equipment is located at the user premise to wirelessly receive the TV content broadcasted by the eNB.

19. The content broadcast system of claim 12, wherein the first MBMS message is an MBMSCountingResponse message, and the second MBMS message is an MBMS Service Counting Results Report message.

20. The non-subscriber user equipment of claim 16, wherein the first MBMS message is an MBMSCountingResponse message, and the second MBMS message is an MBMS Service Counting Results Report message.

* * * * *

UNITED STATES PATENT AND TRADEMARK OFFICE
CERTIFICATE OF CORRECTION

PATENT NO.        : 9,912,985 B2                                      Page 1 of 1
APPLICATION NO.   : 14/499029
DATED             : March 6, 2018
INVENTOR(S)       : Mani et al.

It is certified that error appears in the above-identified patent and that said Letters Patent is hereby corrected as shown below:

In the Claims

Column 21
Line 13, Claim 9, replace "an Long Term Evolution (LTE)" with --a Long Term Evolution (LTE)--.

Signed and Sealed this
Eighth Day of May, 2018

Andrei Iancu
*Director of the United States Patent and Trademark Office*